(12) United States Patent
Nishimura et al.

(10) Patent No.: US 9,995,954 B2
(45) Date of Patent: Jun. 12, 2018

(54) LIQUID CRYSTAL DISPLAY DEVICE

(71) Applicant: NLT Technologies, Ltd., Kanagawa (JP)

(72) Inventors: Hideki Nishimura, Kanagawa (JP); Masato Maki, Kanagawa (JP); Kazuyuki Saito, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 81 days.

(21) Appl. No.: 15/013,526

(22) Filed: Feb. 2, 2016

(65) Prior Publication Data

US 2016/0223853 A1   Aug. 4, 2016

(30) Foreign Application Priority Data

Feb. 4, 2015   (JP) ................. 2015-019973

(51) Int. Cl.
*G02F 1/1333*   (2006.01)
*H05F 3/02*   (2006.01)
*G02F 1/1362*   (2006.01)
*G02F 1/1343*   (2006.01)

(52) U.S. Cl.
CPC .. *G02F 1/133308* (2013.01); *G02F 1/136204* (2013.01); *H05F 3/02* (2013.01); *G02F 1/134363* (2013.01); *G02F 2001/13332* (2013.01); *G02F 2001/133334* (2013.01); *G02F 2202/22* (2013.01)

(58) Field of Classification Search
CPC ..... G02F 1/133308; G02F 2001/13332; G02F 1/134363; G02F 1/136204; G02F 2001/133334; G02F 2202/22; H05F 3/02
USPC ........................................... 349/58
See application file for complete search history.

(56) References Cited

U.S. PATENT DOCUMENTS

2009/0033825 A1\* 2/2009 Fukayama ........ G02F 1/133308
349/58

FOREIGN PATENT DOCUMENTS

JP   2007-093716   4/2007
JP   2011-164529   8/2011

\* cited by examiner

*Primary Examiner* — Charles Chang
(74) *Attorney, Agent, or Firm* — Young & Thompson (57) ABSTRACT

A conductive film stuck to a transparent conductive film of a liquid crystal panel is protruded along a display surface and the protruded part is formed as non-adhesive so that the protruded part is not stuck to the members other than the liquid crystal panel. The protruded part contacts with a conductor on the front frame side so as to electrically connect the transparent conductive film of the liquid crystal panel and the front frame. When the liquid crystal panel moves, the conductive film can move in a direction in parallel to the display surface by following the liquid crystal panel, which prevents deterioration of the conductive film. Therefore, no excessive force works on the stuck part between the transparent conductive film and the conductive film. It solves the exfoliation issue of the conductive film, and the transparent conductive film can be electrically connected to the front frame stably.

4 Claims, 10 Drawing Sheets

PRIOR ART

LIQUID CRYSTAL DISPLAY DEVICE

CROSS-REFERENCE TO RELATED APPLICATION

This application is based upon and claims the benefit of priority from Japanese patent application No. 2015-019973, filed on Feb. 4, 2015, the disclosure of which is incorporated herein in its entirety by reference.

BACKGROUND OF THE INVENTION

1. Field of the Invention

The present invention relates to a liquid crystal display device and, more specifically, to improvements of a lateral electric field type liquid crystal display device in which electrification caused by static electricity and the like affects the display quality.

2. Description of the Related Art

In a liquid crystal display device of lateral electric field type such as IPS (In Plane Switching), there is a phenomenon where the black screen becomes whitish and the display quality is deteriorated when a liquid crystal panel is electrified by static electricity and the like. In order to avoid it, employed is a structure which prevents electrification of the liquid crystal panel, with which: a transparent conductive film such as an ITO (Indium Tin Oxide) film is provided on a display surface side of a color filter substrate (referred to as a CF glass substrate or a counter substrate hereinafter) of the liquid crystal panel; and it is connected to the ground from a front frame through providing a spring-type piece conductor made of metal such as a finger from the ITO film to the front frame.

However, due to reduction in the size of the frame, recently, it is becoming difficult to secure a sufficient area for the ITO film exposed part of the liquid crystal panel. Considering the tolerance for pasting the polarization plate, it is becoming necessary to attach the conductor such as the finger with the ITO film exposed part of about 1.0 mm width.

Further, considering the position precision of the finger and the like, it is becoming turned into a state where the ITO film of the liquid crystal panel cannot be connected securely from the front frame to the ground through the finger.

As described above, techniques for preventing electrification through earthing the liquid crystal panel are disclosed in Japanese Unexamined Patent Publication 2007-093716 (Patent Document 1) and Japanese Unexamined Patent Publication 2011-164529 (Patent Document 2). In the invention disclosed in Patent Document 1, a conductive tape is pasted on a conductive polarization plate to increase an area where the finger can be in contact. However, the conductive tape is extended to the display surface side and covers at least a part of the outer circumference part of a display surface, and that part becomes the substantial frame part. Thus, it is not suited for narrowing the frame.

Figure 10:
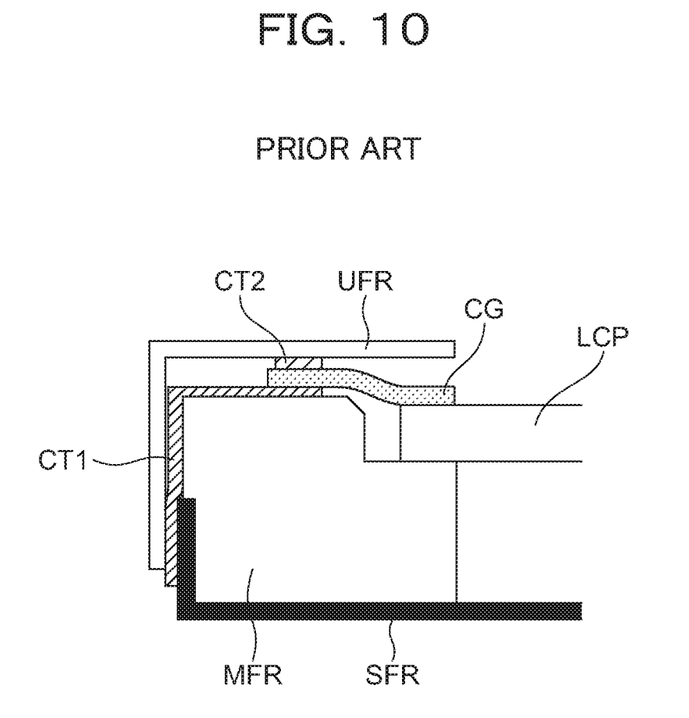
FIG. 10 is a block diagram showing the features of the liquid crystal display device of Patent Document 2.

Further, as shown in FIG. 10, Patent Document 2 presents a method with which: a conductive gum CG is stretched from an ITO film of a liquid crystal panel LCP towards the frame direction; and the conductive gum CG is sandwiched between a front frame UFR and a mold frame MFR along with top and bottom conductive sheets CT2 and CT1 to be electrically connected to the conductive sheet CT1 stably.

With the invention disclosed in Patent Document 2, the frame can be narrowed. However, there is no specific reference made regarding the connection state between the conductive gum CG and the ITO film of the liquid crystal panel LCP.

Further, the conductive gum CG of the invention disclosed in Patent Document 2 is fixed in a pressed state by being clamped via the conductive sheets CT1 and CT2 from the top frame UFR and the mold frame MFR. When there is a move generated in the liquid crystal panel LCP by oscillation or an impact and if the conductive gum CG is expanded/contracted to absorb the move of the liquid crystal panel LCP, it is assumed to have deterioration in the material of the conductive gum CG caused by expansion/contraction or bending. Provided that the conductive gum CG is not easily expanded/contracted or bent, exfoliation may occur in the contact part (stuck part) between the other end of the conductive gum CG that cannot be pressurized by clamping and the liquid crystal panel LCP due to the fact that the conductive gum CG is easily exfoliated from the liquid crystal panel LCP (see the second to fourth lines in paragraph 0038 of Patent Document 2). Therefore, it can be said that there is a limit in stably earthing the ITO film anyhow.

As described, the part where the ITO film is exposed from the polarization plate has become narrowed in accordance with the narrowed frame of the liquid crystal display device. Thus, with the narrowed exposed part of the ITO film, it has become difficult for the contact member such as the finger to contact with the ITO film with high precision and earth the ITO film.

It is therefore an exemplary object of the present invention to provide a liquid crystal display device of a fine display quality through achieving a narrowed frame and stably earthing a transparent conductive film such as an ITO film of a display panel to a front frame.

SUMMARY OF THE INVENTION

In the present invention, a conductive film formed with a conductive adhesive and a conductor is pasted in an exposed part of a narrow transparent conductive film, and the conductive film is formed to spread in an outer side direction of a display screen almost in parallel to a liquid crystal panel.

Further, a conductor attached to a front frame makes contact with the conductive film, and the transparent conductive film on the display surface side of the liquid crystal panel comes to have the same potential with that of the conductive front frame via the conductive film and the conductor. Furthermore, when the ground of an electronic apparatus or the like to which the liquid crystal display device is loaded is in contact with the front frame, the transparent conductive film on the display surface side of the liquid crystal panel is earthed.

Preferably, the part of the conductive film protruded from the liquid crystal panel towards the direction in parallel to the display surface is formed as a structure in which an adhesive is eliminated to be non-adhesive or a structure in which the adhesive agent is covered by a non-adhesive layer (thin film of PET or the like).

It is so designed that the conductive film is not stuck to the members other than the liquid crystal panel. Thus, the conductive film can move by following the liquid crystal panel even when the liquid crystal panel moves due to oscillation or the like, so that a load is not so easily imposed on the pasted part between the transparent conductive film and the conductive film. This makes it possible to prevent exfoliation of the conductive film from the liquid crystal panel.

Further, employed is the structure in which the part of the conductive film protruded from the liquid crystal panel towards the direction in parallel to the display surface is abutted against the conductor on the front frame side, so that it is possible to have a large area of the conductive film to which the conductor can be in contact. Thus, even when there is an error generated at the attaching position of the conductor with respect to the front frame, electric connection between the conductive film and the conductor can be guaranteed stably.

Similarly, since it is the structure in which the part of the conductive film protruded from the liquid crystal panel towards the direction in parallel to the display surface is abutted against the conductor on the front frame side, it becomes unnecessary to place the contact part with the conductor on the display surface of the liquid crystal panel. Therefore, the frame part (the part hiding the display surface) of the liquid crystal panel can be narrowed easily.

In the liquid crystal display device according to the present invention, the conductive film stuck to the transparent conductive film of the liquid crystal panel is protruded from the liquid crystal panel towards a direction in parallel to the display surface; the protruded part is formed as non-adhesive so as not to be stuck to the other members than the liquid crystal panel, and the protruded part of the conductive film is in contact with the conductor of the front frame side to electrically connect the transparent conductive film of the liquid crystal panel to the front frame. Thus, even when the liquid crystal panel moves due to an impact, oscillation, or the like, the conductive film can move towards the direction in parallel to the display surface by following the move of the liquid crystal panel.

Therefore, imprudent expansion/contraction or bending generated in the conductive film can be lightened, so that deterioration in the conductive film can be prevented. At the same time, it is also possible to overcome such inconvenience that an excessive force works on the stuck part between the transparent conductive film of the liquid crystal panel and the conductive film so that the conductive film is exfoliated from the transparent conductive film of the liquid crystal panel.

In this manner, deterioration in the conductive film is prevented and exfoliation of the conductive film is prevented as well. As a result, the transparent conductive film of the liquid crystal panel can be electrically connected to the front frame stably via the conductive film and the conductor.

DETAILED DESCRIPTION OF THE PREFERRED EMBODIMENTS

Next, some exemplary embodiments to which the present invention is applied will be described in a specific manner by referring to the accompanying drawings.

Structures of First Exemplary Embodiment

Figure 1:
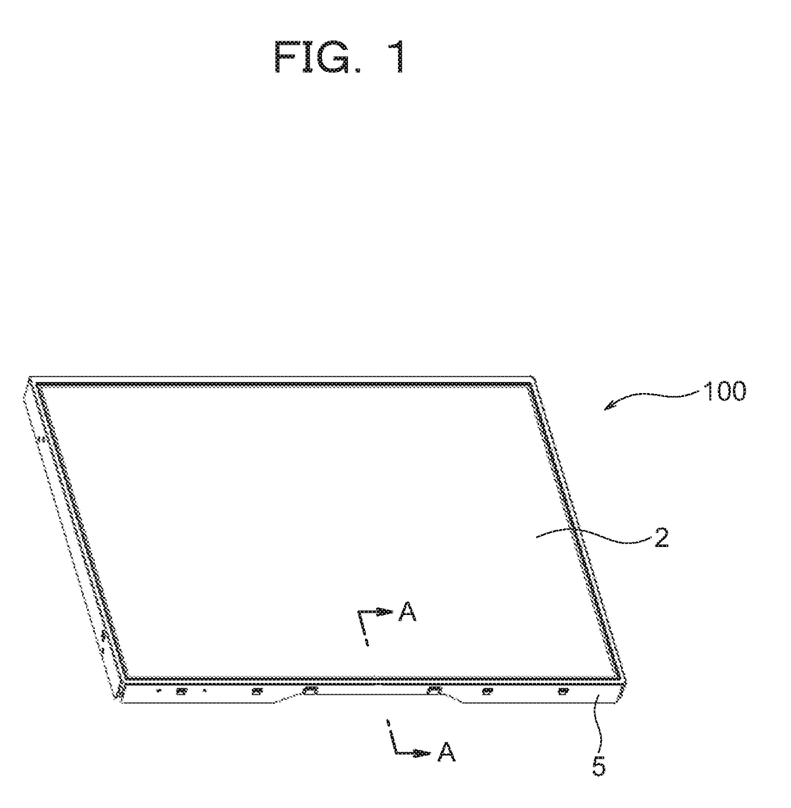
FIG. 1 is a perspective view of a liquid crystal display device according to an exemplary embodiment to which the present invention is applied (a first exemplary embodiment)
Figure 2:
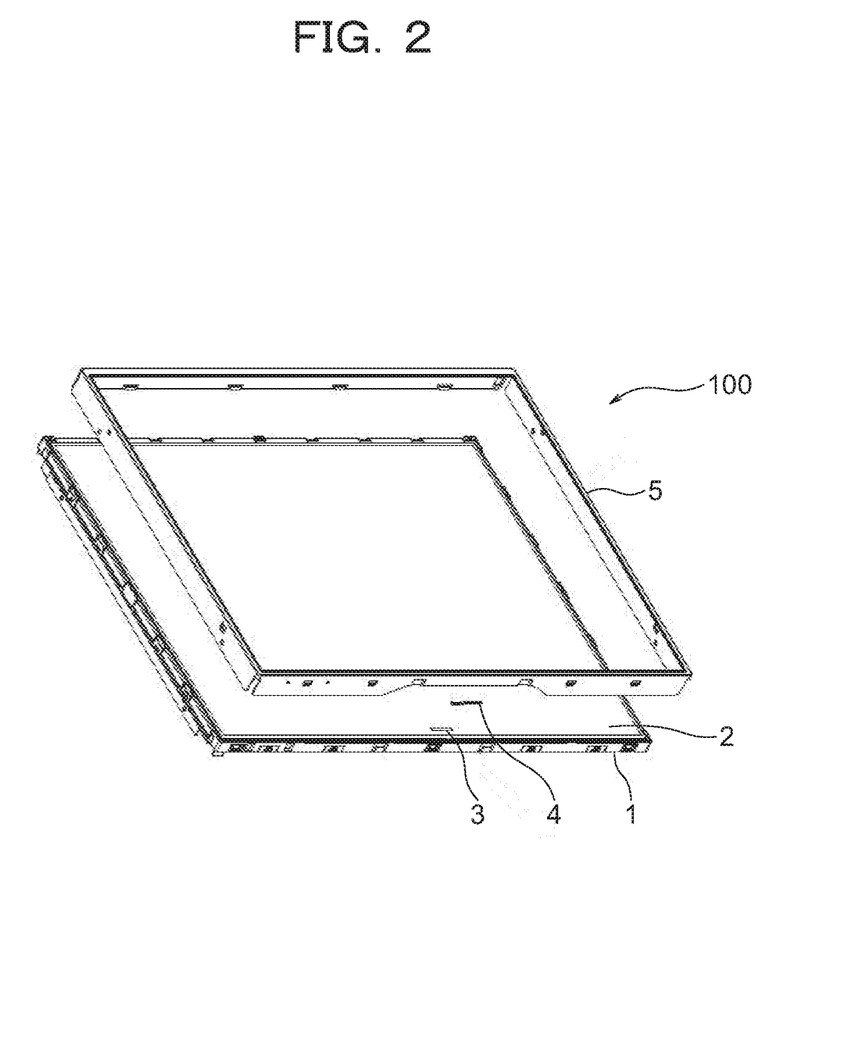
FIG. 2 is a detailed view of the liquid crystal display device of the same exemplary embodiment (the first exemplary embodiment)
Figure 3:
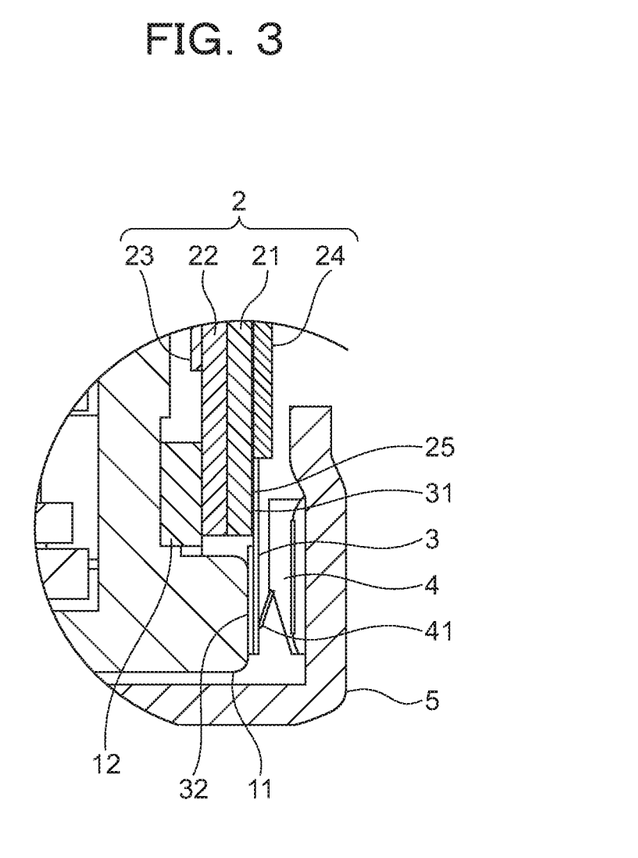
FIG. 3 is a fragmentary sectional view of the liquid crystal display device of the same exemplary embodiment, which shows a section taken along a line A-A of FIG. 1 (the first exemplary embodiment)
Figure 4:
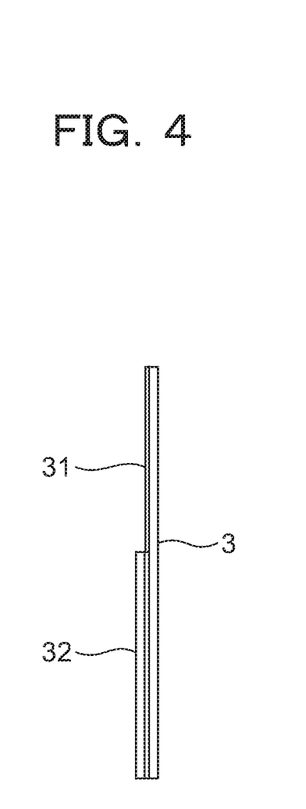
FIG. 4 is a block diagram of a conductive film of the liquid crystal display device of the same exemplary embodiment (the first exemplary embodiment)

FIG. 1 is a perspective view of a liquid crystal display device 100 of an exemplary embodiment to which the present invention is applied, and FIG. 2 is a detailed view thereof. FIG. 3 is a fragmentary sectional view of the liquid crystal display device 100, which shows a section acquired by cutting the periphery of the part where a conductive film is pasted perpendicularly with respect to the display surface of the liquid crystal display device 100, i.e., a section taken along the line A-A of FIG. 1. Further, FIG. 4 is a block diagram of a conductive film 3 in the liquid crystal display device 100 according to this exemplary embodiment of the present invention.

As shown in FIG. 1 and FIG. 2, the liquid crystal display device 100 of this exemplary embodiment includes: a liquid crystal panel 2; a backlight 1 which irradiates light from a back face direction of the liquid crystal panel 2 to show an image on the liquid crystal panel 2; and a front frame 5 which holds the liquid crystal panel 2 and the backlight 1.

In the liquid crystal panel 2, a liquid crystal material is sealed between a CF glass substrate 21 (counter substrate) on the surface side and a TFT substrate 22 (TFT glass substrate) on the back side and, as shown in FIG. 3, a thin conductor ITO film 25 is formed as a transparent conductive film on the surface of the CF glass substrate 21 on the opposite side from the liquid crystal material side, i.e. on the surface side.

Further, on the surfaces of each of the CF glass substrate 21 and the TFT glass substrate 22 on the opposite side of the liquid crystal material, polarization plates 24 and 23 are pasted, respectively.

Further, in a part on the ITO film 25 of the CF glass substrate 21 where the polarization plate 24 is not pasted, as shown in FIG. 3, a conductive film 3 formed with at least a conductive layer and a conductive adhesive is pasted by being extruded out towards the circumference part of a mold chassis 11 from the liquid crystal panel 2. The conductive layer of the conductive film 3 is electrically connected to the front frame 5 via a finger 4 that is a conductor provided on the back face side of the front frame 5.

The TFT glass substrate 22 is held on a spacer 12 that is fixed to the mold chassis 11.

The ITO film 25 functioning as the transparent conductive film is formed on the surface of the CF glass substrate 21 where the polarization plate 24 is pasted, i.e., on the surface side of the CF glass substrate 21. In the part where the polarization plate 24 is not pasted, the ITO film 25 is exposed on the surface as shown in FIG. 3.

The conductive film 3 is pasted to the ITO film 25 via a conductive adhesive layer 31. The conductive film 3 is extended towards the outer side along the surface of the ITO film 25 in a direction in parallel to the surface of the ITO film 25 so as to be extruded out to the mold chassis 11.

Thus, the back face of the conductive film 3 comes to be in contact with the surface of the mold chassis 11 in a thickness direction. The conductive film 3 is a conductive film or a conductive sheet formed with a metal foil, metal cloth, or the like.

As shown in FIG. 3 and FIG. 4, the surface of the conductive film 3 to be in contact with the mold chassis 11 is a non-adhesive layer 32, so that the conductive film 3 and the mold chassis 11 are not stuck to each other.

The finger 4 functioning as a conductor is pasted to the front frame 5. A tip end 41 of the finger 4 is in contact with the conductive film 3 and the ITO film 25 is connected to the front frame 5 via the conductive film 3 and the finger 4, so that the ITO film 25, the conductive film 3, and the front frame 5 come to have a same potential.

In this exemplary embodiment, described is the case where the conductive film 3 and the front frame 5 are electrically in contact with each other via the finger 4. However, a conductive rubber or a conductive gasket may also be used as a conductor instead of the finger 4. Further, in a case of the conductive film 3 shown in FIG. 3 and FIG. 4, the non-adhesive layer 32 is formed by stacking films of PET or the like on a conductive adhesive layer 31 that is formed by stacking a conductive adhesive agent on the entire back face of the conductive film 3.

Actions of First Exemplary Embodiment

In FIG. 3, the ITO film 25 and the front frame 5 come to have a same potential when the conductive film 3 pasted to the ITO film 25 and the finger 4 pasted to the front frame 5 are in contact with each other.

The front frame 5 is electrically in contact with the ground of an electronic apparatus or the like to which the liquid crystal display device 100 is loaded, so that the ITO film 25 is earthed.

Further, out of the conductive film 3 in the part extended out from the ITO film 25, the surface of the conductor film 3 on the opposite side of the finger 4, i.e., the back face of the conductor film 3 in contact with the mold chassis 11, is the non-adhesive layer 32. Thus, even when the liquid crystal panel 2 moves due to oscillation or an impact applied to the liquid crystal display device 100, the conductive film 3 can move by following the move of the liquid crystal panel 2 through making a sliding move on the surfaces of the mold chassis 11 and the finger 4 while keeping the contact state with the finger 4 by being lightly sandwiched between the mold chassis 11 and the finger 4.

Therefore, the load on the conductive film 3 generated in accordance with the move of the liquid crystal panel 2 is lightened, so that exfoliation of the conductive film 3 from the ITO film 25 can be prevented.

Further, since the conductive film 3 is not excessively expanded/contracted or bent by the move of the liquid crystal panel 2, deterioration itself of the conductive film 3 can be prevented as well.

Effects of First Exemplary Embodiment

Conventionally, the finger 4 is formed to be in contact with the ITO film 25 in the part exposed from the polarization plate 24 on the CF glass substrate 21. However, it is necessary to decide the dimensions of each part regarding this exposed part by considering the position shift of the liquid crystal panel 2, the tolerance of the pasting position of the polarization plate 24 with respect to the CF glass substrate 21, the tolerance of the attaching position of the finger 4 with respect to the front frame 5, the position shift of the front frame 5 with respect to the mold chassis 11, and the like. This is an obstacle for narrowing the frame of the liquid crystal panel 2.

In the meantime, in the liquid crystal display device 100 of this exemplary embodiment, the conductive film 3 is pasted to the ITO film 25 and protruded to the space between the liquid crystal panel 2 and the front frame 5. Thus, the contact region of the finger 4 can be expanded. Therefore, even when the frame of the liquid crystal panel 2 is narrowed, the ITO film 25 can be securely earthed and the narrow-framed liquid crystal display device can be achieved.

Further, in the liquid crystal display device 100 of this exemplary embodiment, the surface on the opposite side of the conductor layer of the part of the conductive film 3 extended from the ITO film 25 is formed as a non-adhesive layer. This makes it possible for the conductive film 3 to move by following the liquid crystal panel 2, when the panel 2 moves due to oscillation or an impact applied to the liquid crystal display device 100. Therefore, a tensile force applied to the adhesive part of the conductive film 3 pasted to the ITO film 25 is lightened, so that the pasting strength between the conductive film 3 and the ITO film 25 can be secured. Thereby, it is possible to achieve the liquid crystal display device capable of secure ground earthing.

Further, the part of the conductive film 3 extended from the ITO film 25 is designed to be in contact with the finger 4, so that it is possible to achieve secure ground earthing without adding a contact pressure of the finger 4 to the liquid crystal panel 2.

Conventionally, in a case where the finger is in contact with the ITO film of the liquid crystal panel, the spring pressure of the finger is transmitted to the liquid crystal panel and causes a fault in display. For example, deterioration in the display quality is observed from 50 gf or higher of the contact pressure of the finger, and the contact pressure of the finger and the stable ground connection are in a relation mutually contradicting with each other. However, with the liquid crystal display device 100 of the exemplary embodiment, secure contact, i.e., secure ground connection, can be achieved due to the contact pressure of the finger 4 with a margin (the contact pressure of the finger 4 is not transmitted to the liquid crystal panel 2 with this exemplary embodiment, so that the finger 4 can be pressed to the conductive film 3 with the contact pressure with a margin, i.e., a relatively high contact pressure, which results in achieving secure ground connection.)

Structures of Second Exemplary Embodiment

Figure 5:
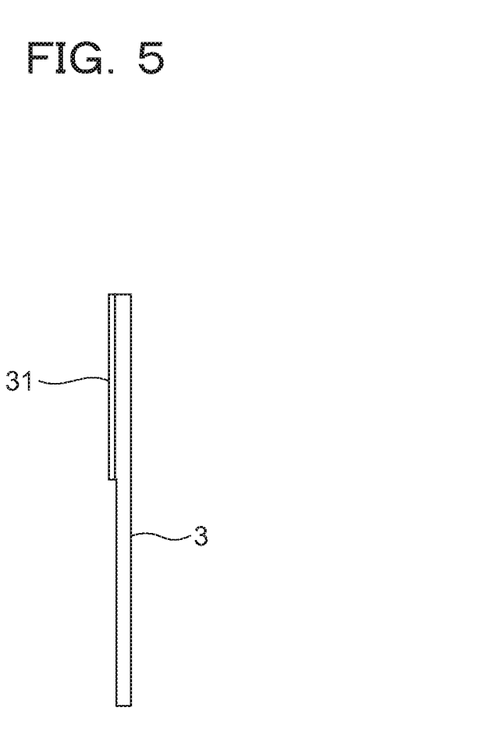
FIG. 5 is a block diagram of a conductive film of a liquid crystal display device of another exemplary embodiment to which the present invention is applied (a second exemplary embodiment)

FIG. 5 is a block diagram of the conductive film 3 of a liquid crystal display device according to another exemplary embodiment to which the present invention is applied.

In the conductive film 3 of the first exemplary embodiment, the non-adhesive layer 32 is disposed further on the conductive adhesive layer 31 that is stacked on the back face of the conductive film 3 (see FIG. 4). In the meantime, in the second exemplary embodiment, as shown in FIG. 5, the conductive adhesive layer 31 is provided only in the part of the back face of the conductive film 3 pasted to the ITO film 25 while the other back face part is formed with the non-adhesive part of the conductive adhesive layer, i.e., with the raw fabric itself of the conductive film 3.

Effects of Second Exemplary Embodiment

With this, the film material such as PET constituting the non-adhesive layer 32 becomes unnecessary so that the cost can be decreased, while the same effects as those of the first exemplary embodiment can be acquired.

Further, in a case where the mold chasses 11 is formed with a conductive material, the back face of the conductive film 3 where the non-adhesive layer of PET or the like is not formed and the mold chassis 11 are directly in contact. Thus, the electric charge charged in the ITO film 25 is connected to the ground further via a path formed with the conductive film 3 and the mold chassis 11 in addition to the path formed with the conductive film 3 and the front frame 5 shown in the first exemplary embodiment.

Structures of Third Exemplary Embodiment

Figure 6:
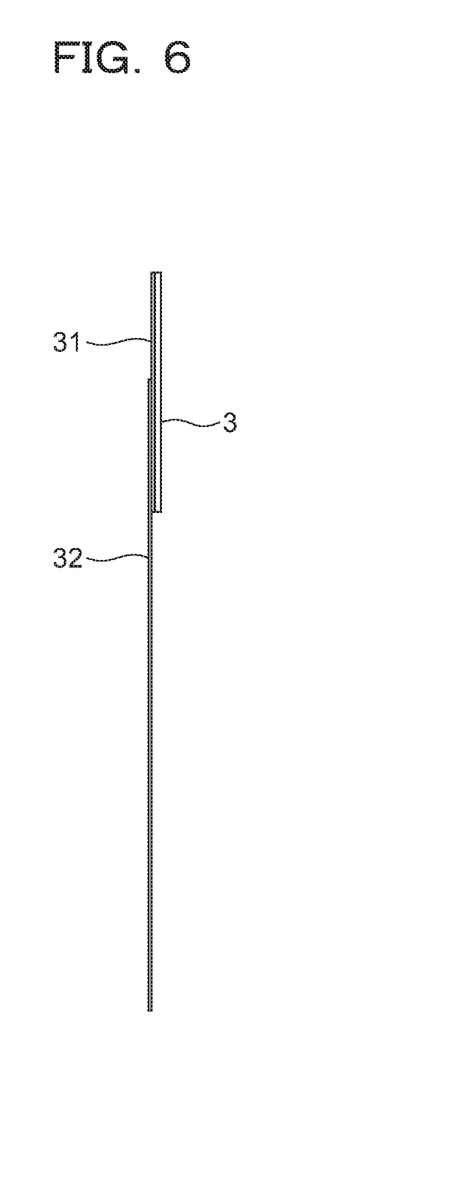
FIG. 6 is a block diagram of a conductive film of a liquid crystal display device of still another exemplary embodiment to which the present invention is applied (a third exemplary embodiment)
Figure 7:
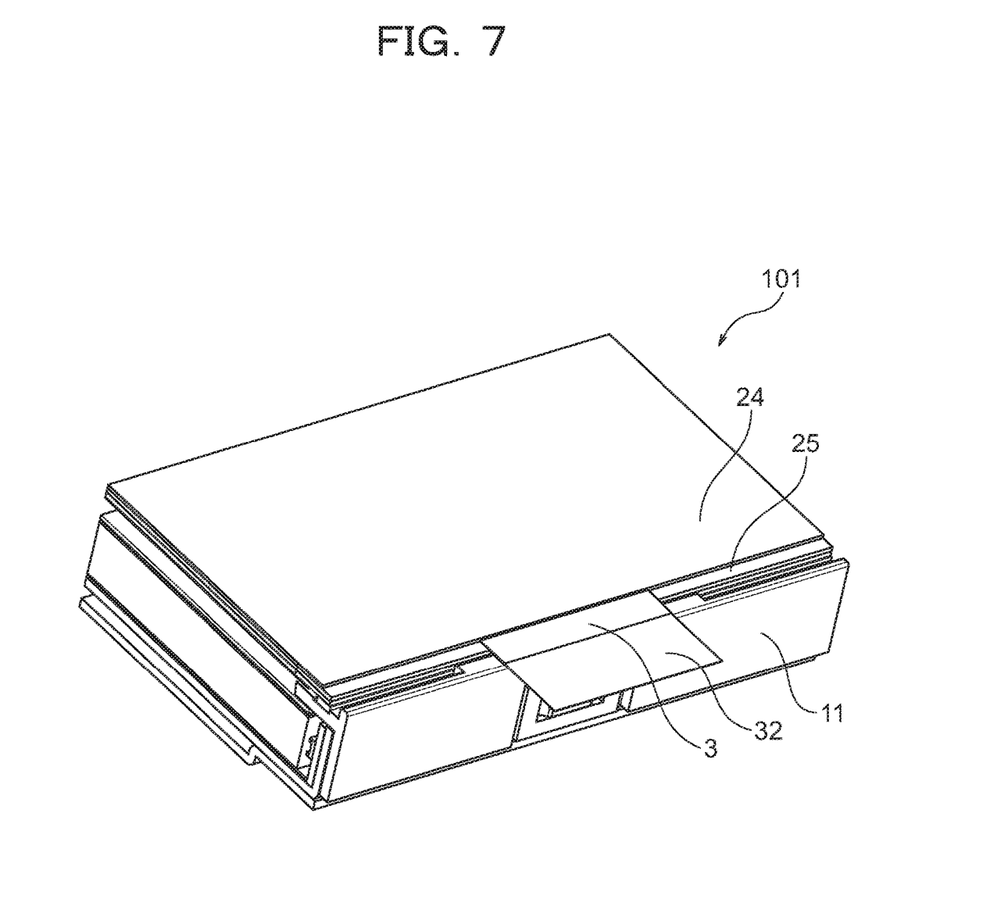
FIG. 7 is a perspective view showing a state where a front frame is detached from the liquid crystal display device of the same exemplary embodiment (the third exemplary embodiment)
Figure 8:
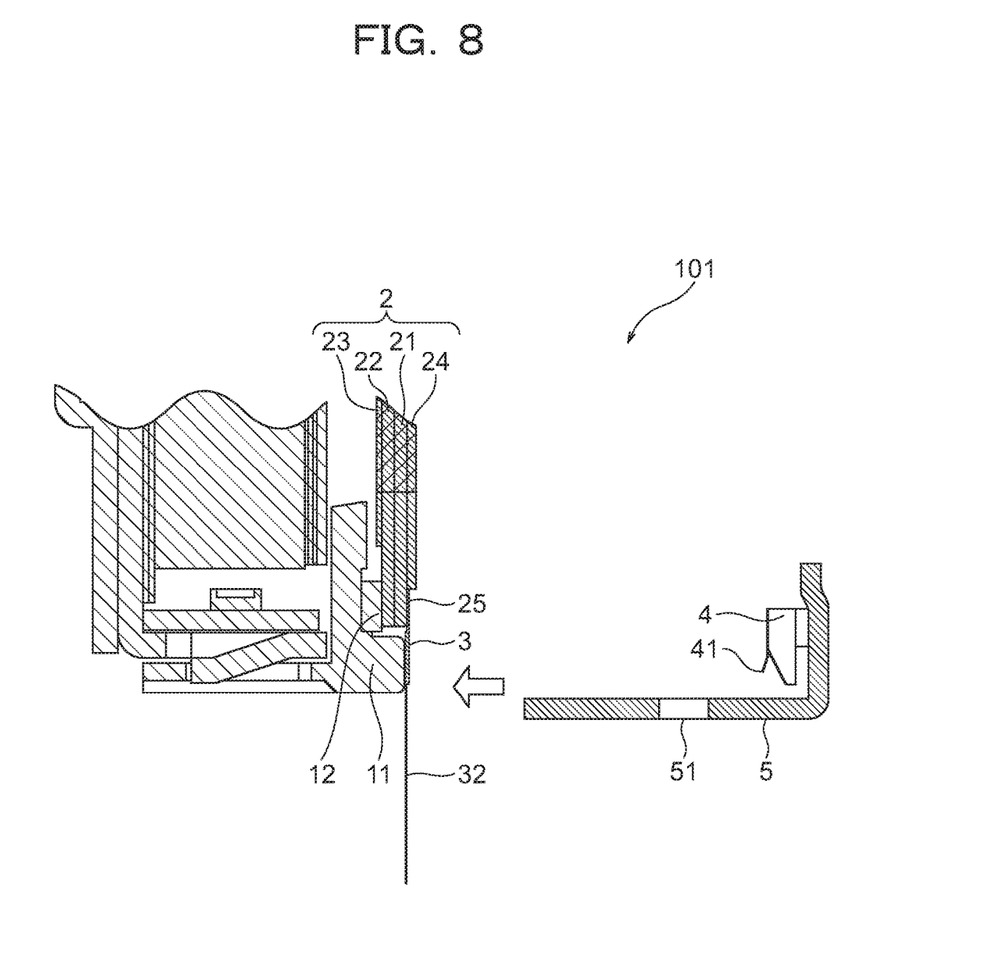
FIG. 8 is a fragmentary sectional view of the liquid crystal display device according to the same exemplary embodiment and the front frame before being attached thereto, which shows a part corresponding to the section taken along the line A-A of FIG. 1 (the third exemplary embodiment)

FIG. 6 is a block diagram of the conductive film 3 of a liquid crystal display device of still another exemplary embodiment to which the present invention is applied, and FIG. 7 is a perspective view showing the liquid crystal display device 101 in a state where the front frame 5 is detached from the liquid crystal display device 101 of the same exemplary embodiment. Further, FIG. 8 is a fragmentary sectional view of the liquid crystal display device 101 according to the same exemplary embodiment and the front frame 5 before being attached thereto, which shows a part corresponding to the section taken along the line A-A of FIG. 1.

The non-adhesive layer 32 of the conductive film 3 shown in FIG. 6 is formed by stacking a film of PET or the like on the conductive adhesive layer 31 that is formed by stacking a conductive adhesive agent on the entire back face of the conductive film 3. The film of PET or the like constituting the non-adhesive layer 32 is formed to be extruded out towards the outer side than the external shape of the conductive film 3.

Effects of Third Exemplary Embodiment

As described, through extruding out the film of the PET or the like constituting the non-adhesive layer 32 from the conductive film 3, the external shape of the conductive film 3 as a whole becomes larger. As a result, as shown in FIG. 7, it becomes easy for the worker to hold the conductive film 3 by the fingers when pasting the conductive film 3 to the ITO film 25 of the liquid crystal panel 2 so that the pasting work of the conductive film 3 to the ITO film 25 can be done easily.

In general, an assembling work of the liquid crystal display device is done by the fingers without using tweezers for not damaging the polarization plate and the like of the liquid crystal panel. Through employing the structure where the film of PET or the like constituting the non-adhesive layer 32 is extruded out towards the outer side than the external shape of the conductive film 3, handling of the conductive film 3 becomes easy. Therefore, the pasting work of the conductive film 3 can be performed easily even without the use of the tweezers or the like.

Figure 9:
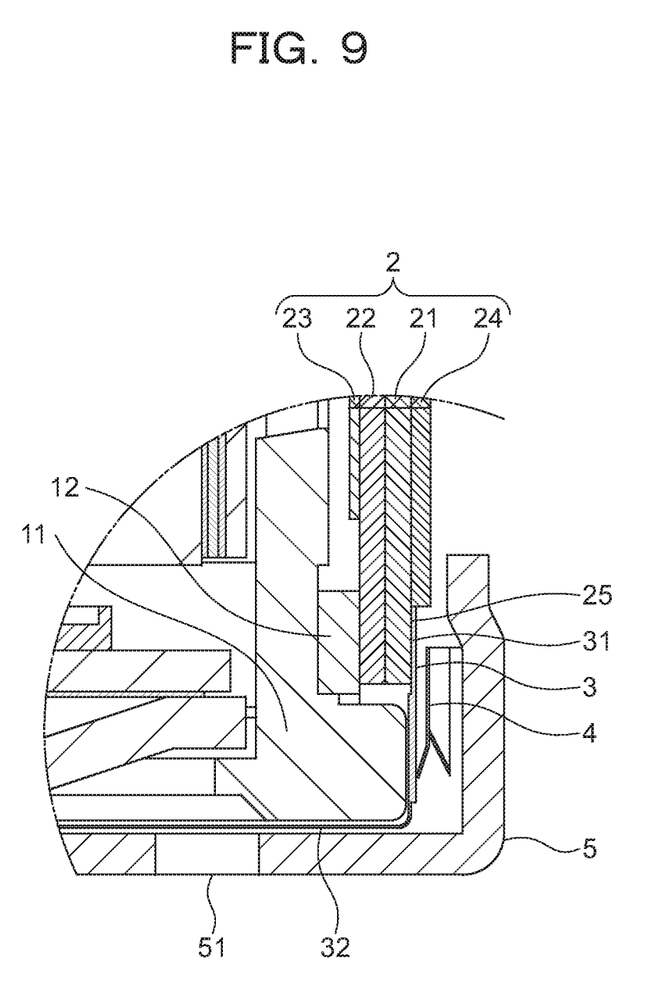
FIG. 9 is a fragmentary sectional view showing a state where of the front frame is attached to the liquid crystal display device according to the same exemplary embodiment, which shows a part corresponding to the section taken along the line A-A of FIG. 1 (the third exemplary embodiment)

Further, as shown in FIG. 8, until the front frame 5 is attached to the backlight 1, the conductive film 3 is in a flat-sheet form and extruded out towards the outer side from the backlight 1. However, as shown in FIG. 9, through fitting the front frame 5 into the backlight 1, the film of the non-adhesive layer 32 extruded out from the backlight 1 is bent at roughly a right angle along the side face of the front frame 5 and housed in a gap formed between the mold chassis 11 and the front frame 5 and a gap formed between the backlight 1 and the front frame 5 at the side face of the liquid crystal display device 101.

Note that the width of the gap formed between the outer circumference of the mold chassis and the inner circumference of the front frame 5 is wider than the thickness of the non-adhesive layer 32, so that the following actions of the conductive film 3 to follow the liquid crystal panel 2 as depicted is allowed also with the third exemplary embodiment.

Further, in a case where the non-adhesive layer 3 is a film with sufficient flexibility, no excessive elastic restoring force is generated when bending the non-adhesive layer 32 and such force is not transmitted to the conductive film 3 and the conductive adhesive layer 31 as bending moment or internal stress. Thus, there is no adverse effect that the load related to the bending of the non-adhesive layer 32 affects the conductive adhesive layer which sticks the conductive film 3 to the CF glass substrate 21. Therefore, there is no risk of having exfoliation of the conductive adhesive layer 31 that may be caused by the bending moment or the internal stress generated by bending of the non-adhesive layer 32 of the conductive film 3.

When the front frame 5 is detached, the non-adhesive layer 32 returns to the original flat-sheet form by the restoring force.

Further, through proving a peeping hole 51 shown in FIG. 9 in the side face of the front frame 5 opposing to the bending part of the non-adhesive layer 32 and employing not a transparent layer but a colored layer as the non-adhesive layer 32, it is possible to check whether or not the conductive film 3 is located at the regular position even under a state where the front frame 5 is fitted to the liquid crystal display device 101.

Further, in a case where the non-adhesive layer 32 exhibits conductivity, the part opposing to the side face of the front frame 5 is covered by an insulating layer, and the conductive layer is exposed only in the part opposing to the peeping hole 51, it is possible to check whether or not the ITO film 25 is earthed to the front frame 5 via the finger 4 by a tester or the like. This conductive checking work can be achieved through placing one end of a probe of a tester to be in contact with the front frame 5 and inserting the other end of the probe from the peeping hole 51 of the front frame 5 to be in contact with the non-adhesive layer 32 in that state.

While the present invention has been described by referring to each of the above exemplary embodiments, the present invention is not limited only to the structures and the actions of each of the above-described exemplary embodiments. Regarding the structures and the details of the present invention, various kinds of changes and modifications occurred to those skilled in the art can be applied. Further, the present invention also includes those acquired by combining a part of or a whole part of each of the above-described exemplary embodiments as appropriate.

A part of or a whole part of the exemplary embodiments disclosed above can be properly expressed by depictions shown in following Supplementary Notes. However, it is to be understood that the modes for embodying the present invention and the technical spirits of the present invention are not limited only to those.

(Supplementary Note 1)

A liquid crystal display device (100), which includes:
a liquid crystal panel (2) including a transparent conductive film (25) on a display surface side;
a conductive film (3) pasted to the transparent conductive film (25);
a conductive front frame (5) having an opening part by corresponding to the display surface of the liquid crystal panel (2), which is provided to cover over an outer circumference part of the liquid crystal panel (2);
a conductor (4) attached to the front frame (5) to be in contact with the conductive film (3); and
a backlight (1) provided to a back face of the liquid crystal panel (2), wherein:
the conductive film (3) is protruded from the liquid crystal panel (2) towards a direction in parallel to the display surface, a conductive adhesive layer (31) is provided to a part pasted to the transparent conductive film (25), and a part protruded from the liquid crystal panel (2) is at least non-adhesive; and
the transparent conductive film (25) is electrically connected to the front frame (5) via the conductive film (3) and the conductor (4) (see FIG. 3, FIG. 4, and FIG. 5).

(Supplementary Note 2)

The liquid crystal display device as depicted in Supplementary Note 1, wherein
the conductor (4) is in contact with the conductive film (3) in the part of the conductive film (3) protruded from the liquid crystal panel (2) (see FIG. 3).

(Supplementary Note 3)

The liquid crystal display device as depicted in Supplementary Note 1 or 2, wherein
the conductive film (3) includes a non-adhesive layer (32) that covers the conductive adhesive layer (31) in the part protruded from the liquid crystal panel (2), the non-adhesive layer (32) being provided on a surface of the part protruded from the liquid crystal panel (2) on an opposite side of the front frame (5) (see FIG. 4).

(Supplementary Note 4)

The liquid crystal display device as depicted in Supplementary Note 3, wherein
the non-adhesive layer (32) is extruded out from an external shape of the conductive film (3), bent along an inner surface of an outer circumference wall of the front frame (5), and housed between a side face of the backlight (1) and an inner side face of the front frame (5) (see FIG. 6, FIG. 7, FIG. 8, and FIG. 9).

(Supplementary Note 5)

The liquid crystal display device as depicted in Supplementary Note 4, wherein
a peeping hole (51) for visually checking whether or not the non-adhesive layer (32) of the conductive film (3) is mounted to a regular position between the side face of the backlight (1) and the inner side face of the front frame (5) is opened in at least one section of the external circumference wall of the front frame (5) (see FIG. 9).

INDUSTRIAL APPLICABILITY

The present invention can be applied to a liquid crystal display device to which a lateral-field type liquid crystal panel is loaded.

What is claimed is:

1. A liquid crystal display device, comprising:
   a liquid crystal panel including a transparent conductive film on a display surface side;
   a conductive film pasted to the transparent conductive film;
   a conductive front frame having an opening part by corresponding to the display surface of the liquid crystal panel, which is provided to cover over an outer circumference part of the liquid crystal panel;
   a conductor attached to the front frame to be in contact with the conductive film;
   a mold chassis holding the liquid crystal panel and being in contact with the conductive film; and
   a backlight provided to a back face of the liquid crystal panel, wherein:
   the conductive film is protruded from the liquid crystal panel towards a direction in parallel to the display surface, a conductive adhesive layer is provided to a part pasted to the transparent conductive film, and a part protruded from the liquid crystal panel is at least non-adhesive;
   the conductive film keeps a contact state with the conductor and the mold chassis by being sandwiched between the conductor and the mold chassis with the non-adhesive part;
   the conductive film is configured, to move by following a movement of the liquid crystal panel by making a sliding move on surfaces of the conductor and the mold chassis while keeping the contact state with the conductor and the mold chassis; and
   the transparent conductive film is electrically connected to the front frame via the conductive film and the conductor.

2. The liquid crystal display device as claimed in claim 1, wherein
   the conductive film includes a non-adhesive layer that covers the conductive adhesive layer in the part protruded from the liquid crystal panel, the non-adhesive layer being provided on a surface of the part protruded from the liquid crystal panel on an opposite side of the front frame.

3. The liquid crystal display device as claimed in claim 2, wherein
   the non-adhesive layer is extruded out from an external shape of the conductive film, bent along an inner surface of an outer circumference wall of the front frame, and housed between a side face of the backlight and an inner side face of the front frame.

4. The liquid crystal display device as claimed in claim 1, wherein
   the conductive film is formed with a metal foil or metal cloth.

* * * * *